Feb. 18, 1947.   C. R. WAGNER   2,415,921
SEPARATION OF BUTENES, n-BUTANE, C-3 AND LIGHTER HYDROCARBONS
BY EXTRACTIVE DISTILLATION
Filed Feb. 10, 1944
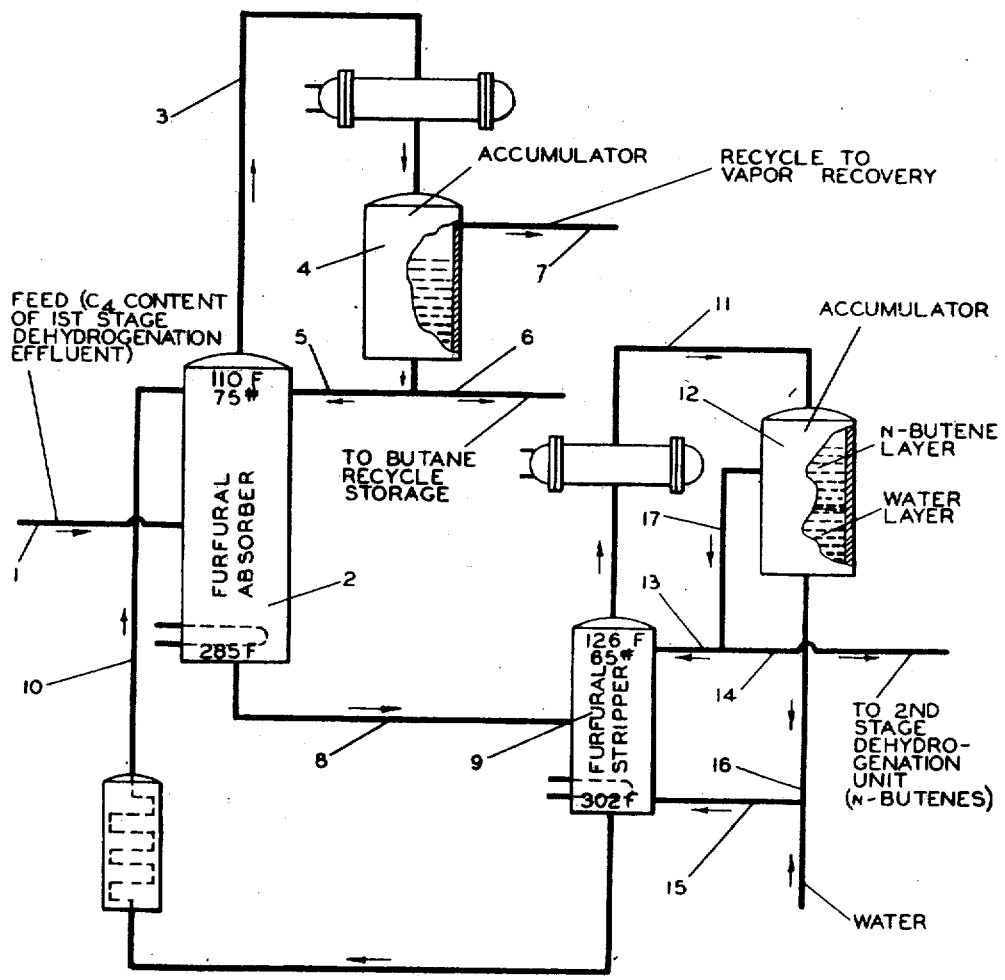
INVENTOR
C. R. WAGNER
BY *Hudson, Young & Jingu*
ATTORNEYS Patented Feb. 18, 1947

2,415,921

UNITED STATES PATENT OFFICE 2,415,921

SEPARATION OF BUTENES, N-BUTANE, C-3 AND LIGHTER HYDROCARBONS BY EXTRACTIVE DISTILLATION

Cary R. Wagner, Utica, Ohio, assignor to Phillips Petroleum Company, a corporation of Delaware Application February 10, 1944, Serial No. 521,836

3 Claims. (Cl. 202—39.5)

1

This invention relates to a method for separation and recovery of C₄ hydrocarbons from a complex hydrocarbon mixture comprising both normally gaseous and normally liquid hydrocarbons of both saturated and unsaturated linkages. More specifically, this invention relates to the preparation of a satisfactory normal butene feed stock to be catalytically dehydrogenated to butadiene. This invention further relates to a process wherein a n-butane-butene-1-butenes-2 (both low and high boiling) mixture, such as that obtained from first stage dehydrogenation of n-butane in a two step dehydrogenation process for manufacture or butadiene, is charged to a selective solvent extractive distillation unit wherein said n-butane is recovered as a separate product and recycled to first stage dehydrogenation and the butene-1 and butenes-2 (both low and high boiling) are recovered as a combined product and charged to second stage dehydrogenation for conversion to butadiene.

The object of my invention is to prepare a satisfactory butene feed stock for second stage dehydrogenation. Another object of my invention is the separation of a complex hydrocarbon mixture in order to recover n-butane of suitable purity and concentration for recycle to first stage dehydrogenation and also to recover a combined butenes product of suitable concentration and purity to be used in second stage dehydrogenation by charging a complex C₄ hydrocarbon mixture to a selective solvent extractive distillation unit.

This extractive distillation process using a selective solvent is advantageous since it makes possible the separation and recovery of n-butane stock for recycle to first stage dehydrogenation simultaneously with the preparation of a combined normal butene feed stock for charging to a second stage dehydrogenation unit.

The accompanying drawing schematically illustrates my invention and shows the distribution of the principal hydrocarbons.

In accordance with my invention the n-butane and the combined normal butenes are recovered as the finished products from separation of a complex hydrocarbon mixture comprising principally C₄ hydrocarbons. In addition this mixture may contain small amounts of hydrogen, methane, ethane, ethylene, propane, propylene, C₅ and heavier hydrocarbons. This separation is accomplished by liquid-vapor contacting of the hydrocarbon mixture with a selective solvent in an extractive distillation unit, absorber 2. This absorber is a tower, the upper section of which acts

2 as an absorber for the normal butenes using a relatively non-volatile solvent introduced at the top of the absorber, 2, through line 10. For the purpose of discussing my invention, furfural containing a small amount of dissolved water has been selected as an example from the group of various solvents available. Various other solvents that will meet the practical requirements for C₄ hydrocarbon separations by solvent extraction are disclosed in co-pending application, Serial No. 454,312 filed August 10, 1942. The bottom section of tower 2 acts as a stripper to remove n-butane which is absorbed to some extent in the top section of the tower. The reboiling of the solvent at the bottom of the tower furnishes the necessary vapors to carry out this stripping while returning part of the overhead product 3 as reflux to the top of the tower by line 5 serves to remove the heat added by the reboiler. The overhead product 3 comprising mainly n-butane with substantially all of any C₃ and lighter hydrocarbons introduced in the feed is condensed and introduced into reflux accumulator 4. A portion of the lighter hydrocarbons are bled off from accumulator 4 in order to reduce pressure in the system. These lighter hydrocarbons are recycled via line 7 to a vapor recovery unit (not shown). A n-butane-rich hydrocarbon stream is removed from the bottom of reflux accumulator 4, a portion of this n-butane-rich stream is returned as reflux to the top of the absorber 2 through line 5, the rest of said n-butane rich stream being recycled to first stage dehydrogenation or to butane storage by means of line 6.

The furfural solvent containing in solution the normal butenes as well as any isobutylene present is withdrawn from the bottom of absorber 2 through line 8. This butenes-rich solvent on leaving the bottom of absorber 2 is passed to a solvent stripper 9 where the combined butenes are removed overhead through line 11 while the lean or denuded solvent is returned after suitable cooling to the top of absorber 2 through line 10. In order to keep from using excessive temperatures on the reboiler of the stripping tower 9, water is introduced through line 15 to the bottom of stripper 9 where it is vaporized and furnishes part of the necessary stripping vapor. The water going overhead with the butenes product is condensed and returned to the reboiler thereby being maintained in a short closed cycle. The butenes thus stripped from the furfural are passed overhead through line 11, condensed and passed to accumulator 12 wherein the condensate is separated into two layers, one of water which is withdrawn and recycled to stripper 9 via line 16, and the other of the combined normal butenes which are withdrawn via line 17. Part of the combined butenes are returned through line 13 to the top of the stripping tower 9 as reflux, the remainder of the combined butenes are charged as feed stock to a second stage dehydrogenation unit (not shown) for conversion to butadiene.

*Example*

In actual operation of first stage dehydrogenation of n-butane, a roughly stabilized $C_4$ hydrocarbon mixture was introduced to the furfural absorber 2 through line 1. This $C_4$ rich feed stream had the following composition:

| Component | Stream 1, mol per cent |
|---|---|
| $C_3$ and lighter | 2.34 |
| Butadiene | .13 |
| Isobutylene | 1.00 |
| Butene-1 | 25.44 |
| Butene-2 (low boiling) | 14.30 |
| Butene-2 (high boiling) | 10.42 |
| n-Butane | 46.31 |
| $C_5$ and heavier | .06 |
| | 100.00 |

This feed stock was introduced into a 100 plate bubble tray absorber 2 through line 1, at the center of the column. Furfural containing a small percentage of water and traces of hydrocarbon was introduced into absorber 2 near the top of the absorber through line 10. The mol ratio of the furfural introduced near the top of the column to the quantity of hydrocarbon feed to the tower was about 34.2:1. The hydrocarbon reflux ratio based on hydrocarbon feed was about 5.39:1. The average tower operating pressure was 75 pounds per square inch absolute, the top temperature was 110° F. and the bottom temperature was 285° F. The overhead vapors withdrawn through line 3 were condensed and collected in reflux accumulator 4. This overhead vapor stream 3 had the following composition:

| Component | Stream 3, mol per cent |
|---|---|
| $C_3$ and lighter | 4.18 |
| Isobutylene | .03 |
| Butene-1 | 2.78 |
| n-Butane | 93.01 |
| | 100.00 |

Some of the lighter hydrocarbons were drawn off from the reflux accumulator 4 through line 7. This stream, which was recycled to a vapor recovery unit, had the following composition:

| Component | Stream 7, mol per cent |
|---|---|
| $C_3$ and lighter | 27.40 |
| Butene-1 | 3.48 |
| n-Butane | 69.12 |
| | 100.00 |

A n-butane-rich hydrocarbon stream was withdrawn from the bottom of reflux accumulator 4 and divided, the larger part of this stream was returned as reflux to the top of the absorber 2 through line 5, the rest of the n-butane-rich stream was recycled to a first stage dehydrogenation unit through line 6 for conversion to butenes. This n-butane-rich hydrocarbon stream had the following composition:

| Component | Stream 5 or 6, mol per cent |
|---|---|
| $C_3$ and lighter | 4.14 |
| Isobutylene | .03 |
| Butene-1 | 2.77 |
| n-Butane | 93.06 |
| | 100.00 |

The composition of the product withdrawn from the bottom of absorber 2 through line 8 was as follows:

| Component | Stream 8, mol per cent |
|---|---|
| Butadiene | Trace |
| Isobutylene | .03 |
| Butene-1 | .74 |
| Butene-2 (low boiling) | .44 |
| Butene-2 (high boiling) | .32 |
| n-Butane | .04 |
| $C_5$ and heavier | Trace |
| Furfural | 98.43 |
| | 100.00 |

This butenes-rich furfural stream from the bottom of absorber 2 was introduced into stripper 9, a 20 tray fractionator, through line 8. The stripper 9 was operated with a reflux of 6.7:1, average pressure of 65 pounds per square inch absolute, top temperature of 126° F. and bottom temperature of 302° F. The lean furfural containing a small percentage of water was withdrawn through line 10. This lean furfural stream had the following composition:

| Component | Stream 10, mol per cent |
|---|---|
| Butadiene | Trace |
| Isobutylene | Trace |
| Butene-1 | .05 |
| Butene-2 (low-boiling) | .03 |
| Butene-2 (high boiling) | .02 |
| n-Butane | Trace |
| Furfural (with a small percentage of water) | 99.90 |
| | 100.00 |

The overhead product from stripper 9 consisting principally of butenes and vaporized water was withdrawn through line 11, condensed and introduced into accumulator 12. The hydrocarbon portion of this overhead product was then removed from accumulator 12 via line 17 and divided, part of the butenes was returned as reflux to the top of stripper 9 through line 13, the remainder of the butenes was charged to a second stage dehydrogenation unit through line 14. This overhead product had the following composition:

| Component | Stream 13 or 14, mol per cent |
|---|---|
| Butadiene | 0.26 |
| Isobutylene | 1.93 |
| Butene-1 | 46.99 |
| Butene-2 (low boiling) | 27.95 |
| Butene-2 (high boiling) | 20.40 |
| n-Butane | 2.37 |
| $C_5$ and heavier | .10 |
| | 100.00 |

The above example of the operation of my invention has disclosed the method and means whereby a complex stream containing principally n-butane, butene-1 and butenes-2 (both low and high boiling) can be separated into n-butane and combined butenes stream by subjecting the complex hydrocarbon mixture to selective solvent extractive distillation.

Preferably the furfural in the system is maintained with a dissolved water content ranging from 1% by weight up to saturation, in accordance with the disclosure of copending application, Serial No. 438,844, filed April 13, 1942. This water enables the maintenance of markedly lower temperatures in the bottom of fractionating-absorption column 2 and stripping column 9. Extraneous water to make up system losses is added, preferably continuously, via line 15.

I claim:

1. The process of recovering a normal butane stream suitable for recycle to a step in which normal butane is catalytically dehydrogenated to butene-1 and butene-2 and a combined butene-1 and butene-2 stream suitable as feed to a step in which normal butenes are catalytically dehydrogenated to butadiene from a principally $C_4$ hydrocarbon mixture derived from the effluent of the catalytic dehydrogenation of normal butane to butene-1 and butene-2, said mixture being composed principally of unconverted normal butane and butene-1 and butene-2 and containing a small amount of $C_3$ hydrocarbons and lighter which comprises subjecting said $C_4$ hydrocarbon mixture to extractive distillation with a relatively non-volatile selective solvent which dissolves butenes in preference to butane and thereby effecting solution of the butene content of said mixture while causing the butane content thereof to pass overhead undissolved substantially free from butene and in admixture with substantially all of the $C_3$ hydrocarbon and lighter content, condensing said overhead and passing same into an accumulator, withdrawing from said accumulator a vaporous fraction containing most of the $C_3$ and lighter and a liquid condensate fraction composed essentially of normal butane, refluxing the extractive distillation zone with a portion of said condensate fraction, the remainder of said condensate fraction constituting said normal butane stream suitable for recycle, reboiling the rich solvent and driving off absorbed butane in the bottom section of the extractive distillation zone, withdrawing from the bottom of the extractive distillation zone solvent enriched in butenes but substantially free of butane, and stripping said enriched solvent to recover the butenes content thereof substantially free from butane, the resulting butenes mixture being composed essentially of butene-1 and butene-2 and constituting said combined butene-1 and butene-2 stream suitable as feed to a step in which normal butenes are dehydrogenated to butadiene.

2. The process of recovering a normal butane stream suitable for recycle to a step in which normal butane is catalytically dehydrogenated to butene-1 and butene-2 and a combined butene-1 and butene-2 stream suitable as feed to a step in which normal butenes are catalytically dehydrogenated to butadiene from a principally $C_4$ hydrocarbon mixture derived from the effluent of the catalytic dehydrogenation of normal butane to butene-1 and butene-2, said mixture being composed principally of unconverted normal butane and butene-1 and butene-2 and containing a small amount of $C_3$ hydrocarbons and lighter which comprises subjecting said $C_4$ hydrocarbon mixture to extractive distillation with furfural containing at least 1% by weight of dissolved water and thereby effecting solution of the butene content of said mixture while causing the butane content thereof to pass overhead undissolved, substantially free from butene and in admixture with substantially all of the $C_3$ hydrocarbon and lighter content, condensing said overhead and passing same into an accumulator, withdrawing from said accumulator a vaporous fraction containing most of the $C_3$ and lighter and a liquid condensate fraction composed essentially of normal butane, refluxing the extractive distillation zone with a portion of said condensate fraction, the remainder of said condensate fraction constituting said normal butane stream suitable for recycle, reboiling the rich furfural and driving off absorbed butane in the bottom section of the extraction distillation zone, withdrawing from the bottom of the extractive distillation zone furfural enriched in butenes but substantially free of butane, and stripping said enriched furfural in a separate stripping zone to recover the butenes content thereof substantially free from butane, the resulting butenes mixture being composed essentially of butene-1 and butene-2 and constituting said combined butene-1 and butene-2 stream suitable as feed to a step in which normal butenes are dehydrogenated to butadiene.

3. The process of recovering a normal butane stream suitable for recycle to a step in which normal butane is catalytically dehydrogenated to butene-1 and butene-2 and a combined butene-1 and butene-2 stream suitable as feed to a step in which normal butenes are catalytically dehydrogenated to butadiene from a principally $C_4$ hydrocarbon mixture derived from the effluent of the catalytic dehydrogenation of normal butane to butene-1 and butene-2, said mixture being composed principally of unconverted normal butane and butene-1 and butene-2 and containing a small amount of $C_3$ hydrocarbons and lighter which comprises subjecting said $C_4$ hydrocarbon mixture to extractive distillation with furfural containing at least 1% by weight of dissolved water and thereby effecting solution of the butene content of said mixture while causing the butane content thereof to pass overhead undissolved, substantially free from butene and in admixture with substantially all of the $C_3$ hydrocarbon and lighter content, condensing said overhead and passing same into an accumulator, withdrawing from said accumulator a vaporous fraction containing most of the $C_3$ and lighter and a liquid condensate fraction composed essentially of normal butane, refluxing the extractive distillation zone with a portion of said condensate fraction, the remainder of said condensate fraction constituting said normal butane stream suitable for recycle, reboiling the rich furfural and driving off absorbed butane in the bottom section of the extraction distillation zone, withdrawing from the bottom of the extractive distillation zone furfural enriched in butenes but substantially free of butane, stripping said enriched furfural in a separate stripping zone to recover the butenes content thereof substantially free from butane, introducing water into the bottom of the stripping zone to effect a lowering of the temperature therein, condensing the vapors of butenes and water recovered overhead from the stripping zone, causing the condensate to separate into an aqueous layer and a butenes layer, withdrawing said aqueous layer and recycling same as a source of said water introduced into the bottom of said stripping zone, withdrawing said butenes layer, and refluxing the top of said stripping zone with a portion of said withdrawn butenes layer, the remainder of said butenes layer being composed essentially of butene-1 and butene-2 and constituting said combined butene-1 and butene-2 stream suitable as feed to a step in which normal butenes are dehydrogenated to butadiene.

CARY R. WAGNER.

REFERENCES CITED

The following references are of record in the file of this patent:

UNITED STATES PATENTS

| Number | Name | Date |
|---|---|---|
| 1,948,777 | Young | Feb. 27, 1934 |
| 1,919,752 | Schmidt et al. | July 25, 1933 |
| 1,882,978 | Schmidt et al. | Oct. 18, 1932 |
| 2,350,584 | Buell et al. | June 6, 1944 |
| 2,350,609 | Hackmuth | June 6, 1944 |
| 2,209,215 | Wiezevich | July 30, 1940 |